May 26, 1970
G. R. LINDEN
3,514,027
WIRE STITCHING APPARATUS
Filed Dec. 6, 1967
5 Sheets-Sheet 1
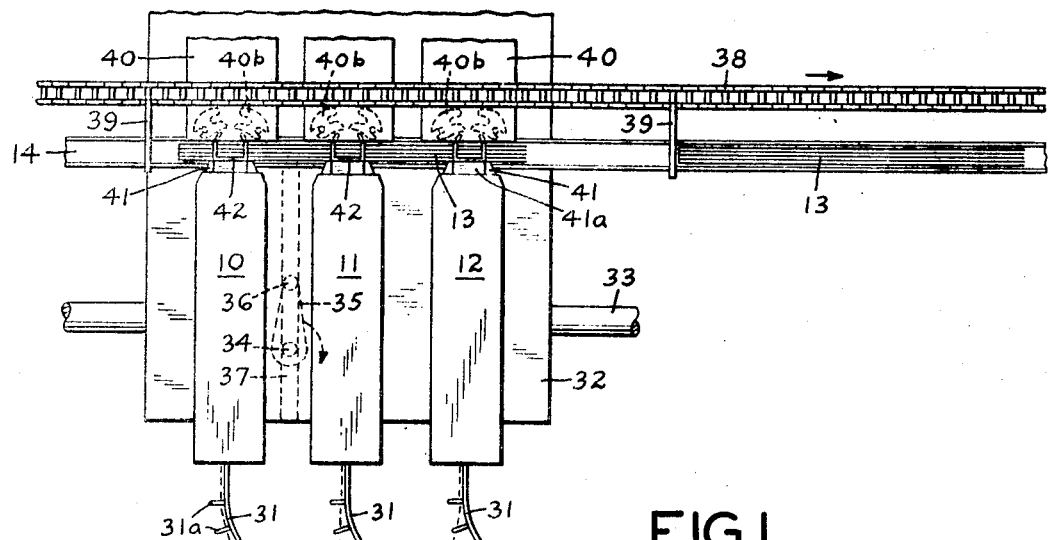
FIG.1.
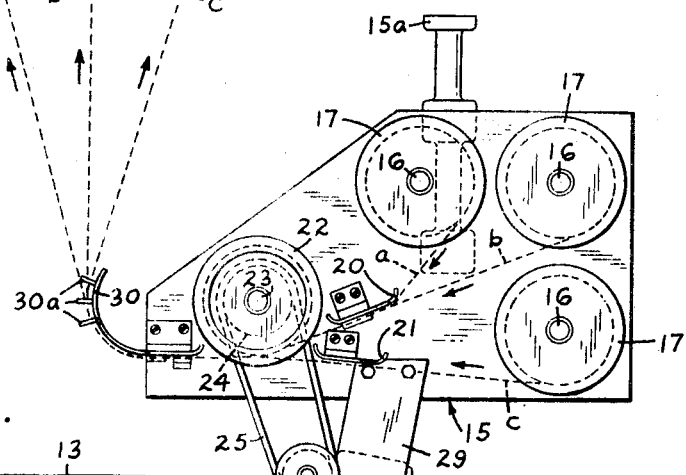
FIG.2.
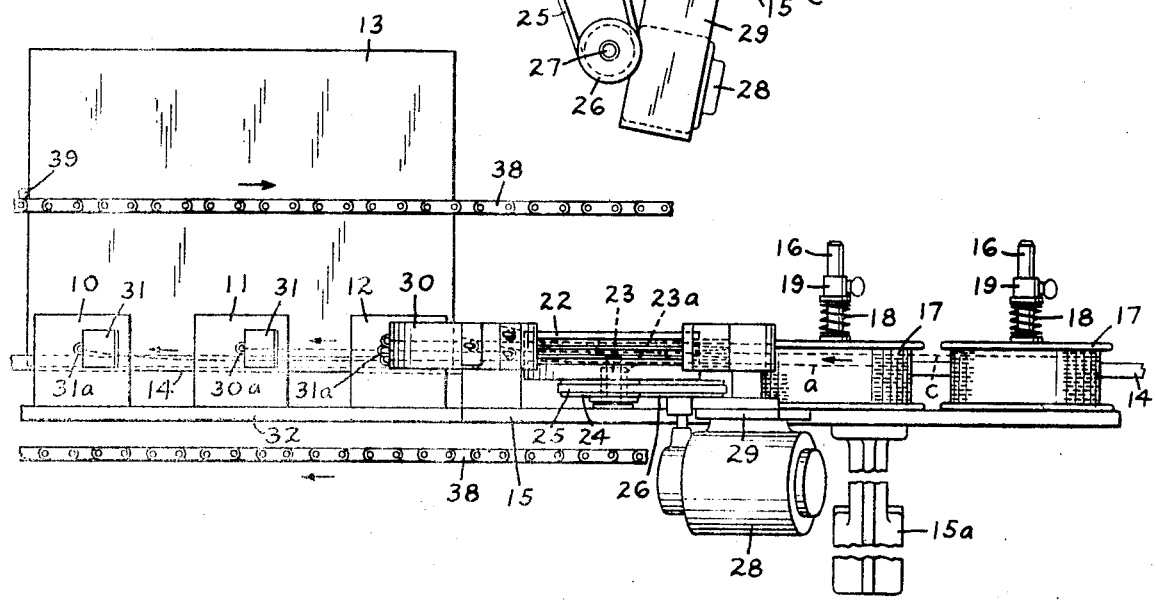

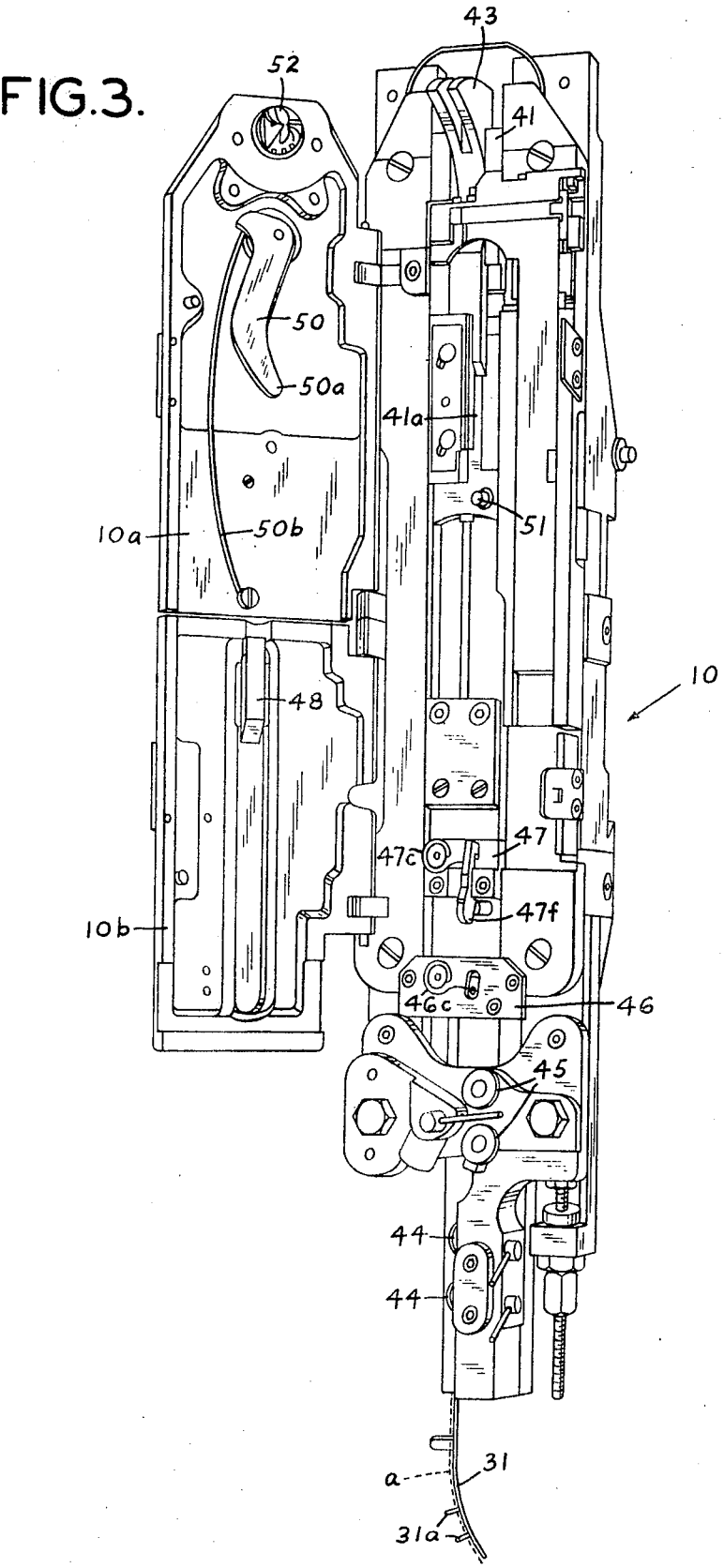

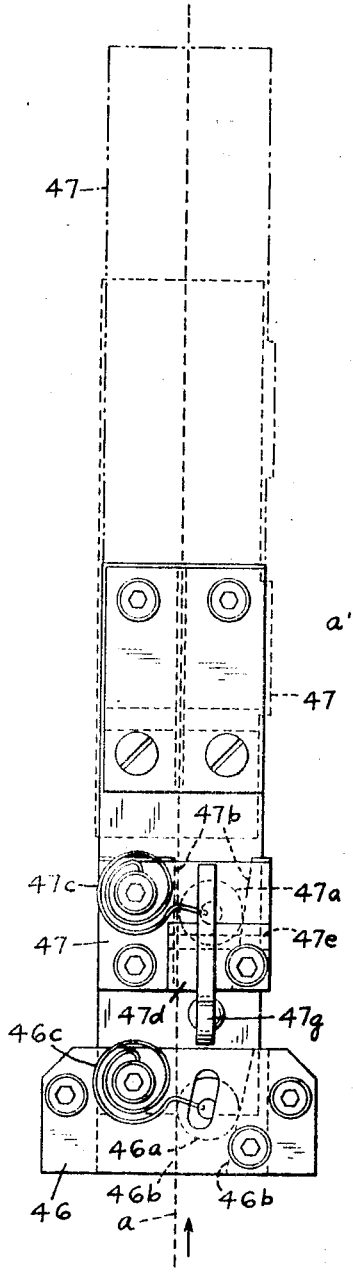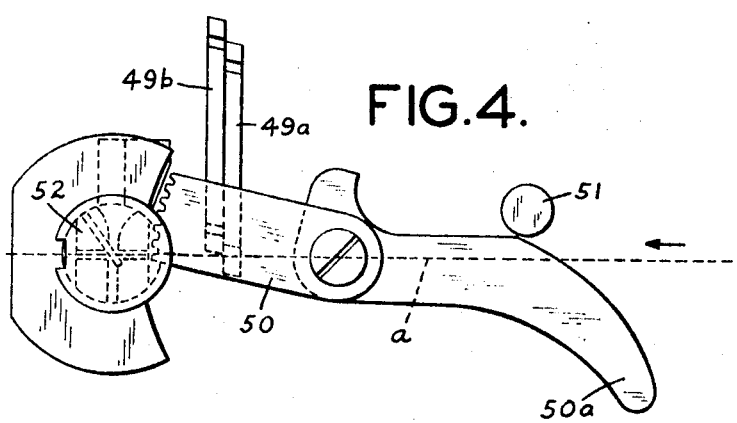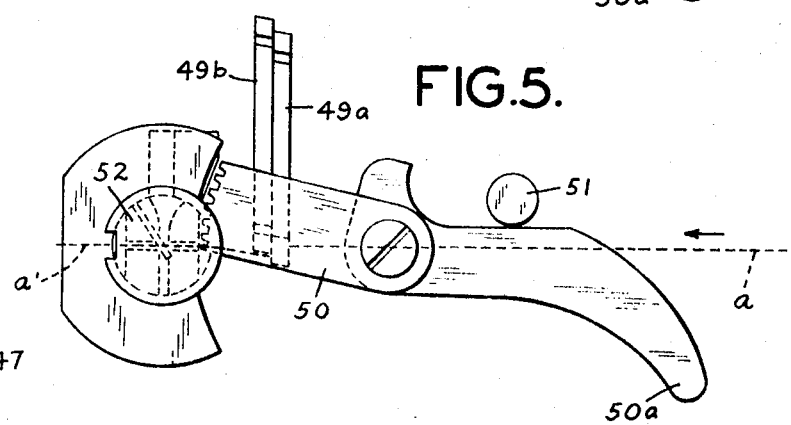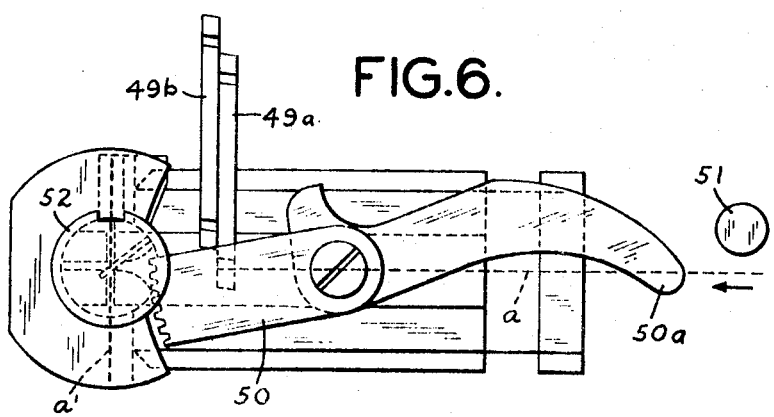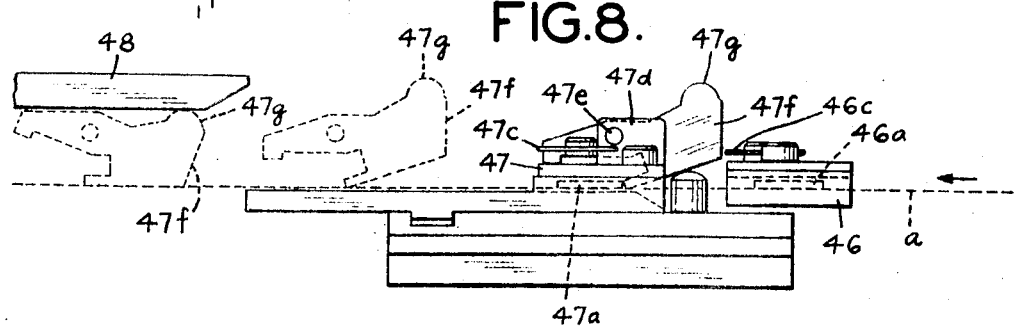

United States Patent Office 3,514,027
Patented May 26, 1970

3,514,027
WIRE STITCHING APPARATUS
Gosta R. Linden, Park Ridge, N.J., assignor to Miehle-Goss-Dexter Incorporated, Chicago, Ill., a corporation of Delaware
Filed Dec. 6, 1967, Ser. No. 688,542
Int. Cl. B27f 7/06
U.S. Cl. 227—81             1 Claim

ABSTRACT OF THE DISCLOSURE

Apparatus for applying wire stitching or staples to booklets and the like with great uniformity in providing the desired length of the wire used in forming each staple or stitch. It incorporates a capstan feed device for supplying the desired lengths of wire to one or more stitching heads. The resistance to turning of the wire carrying spool, to prevent delivery of an excessive amount of wire as it is pulled from a spool, is obtained from the frictional engagement of the spool with a supporting surface by its own weight, or may be supplemented by a single adjustment of a spring force. The capstan is constantly rotated but it is rendered active only as the wire is being advanced by the feeding mechanism of the stitching head. This results in tightening of the wire around the capstan and causes the latter to become effective in controlling the supply of wire from one or more spools to their respective stitching heads. The feeding of the wire is uniform throughout the withdrawal of wire from spools which are relatively heavy at the start but become much lighter as the quantity of wire on the spools diminishes.

---

This invention relates to improved apparatus for applying wire stitching or staples to pamphlets, booklets, magazines or the like, to bind together the various signatures or page members to be incorporated in the item.

The apparatus heretofore conventionally employed for the foregoing purpose has frequently run into difficulties leading to the improper application of staples to the items mentioned. These difficulties have most frequently involved the improper feeding of wire from spools to the stitching units. Such improper withdrawal of wire from the spools has frequently led to the snarling or kinking or entanglement of portions of the wire between the spool, from which it is supplied, and the stitch forming device which is employed to form the individual staples and apply them to the booklet or the like. This has been due, in part, to the quite substantial change in the weight of a spool of wire from the time at which it is completely supplied with wire and the time when the wire on the spool is about exhausted. This has frequently necessitated periodic adjustment of the resistance to turning of the spool as the wire is being pulled from it, in order to insure uniform action without requiring an excessive tension to be used when the spool is full.

To overcome the difficulties heretofore encountered in the operation of wire stitching apparatus, the present invention contemplates the use of special mechanical means for withdrawing wire from the various spools to meet the requirements of the stitching heads without developing any undue slack between the spools and the stitching heads. This is achieved, in accordance with the preferred embodiment of the invention, by positioning a capstan member in the path of movement of the wire from the spools to the stitching heads. This capstan member is preferably such that it is capable of applying its pulling action to the wires supplied from a plurality of spools, whenever required, for delivery to one or more stitching heads. Briefly stated, this involves the provision of separate channels or areas in parallel regions around the outer surface of the capstan, so that the wire from each of several spools may be wound one or two turns around the capstan, each of the wires having its own channel or area in which it is wrapped. The wires leaving the capstan are then properly threaded into the various elements of the stitching head. This arrangement is such that, when the stitching heads require no further wire to be supplied thereto, the coils of wire wrapped about the capstan become loose, so that the continuous rotation of the capstan from a suitable power source, such as an electric motor, will not pull further wire from the spools. On the other hand, when a stitching head requires further wire to form another stitch or staple, the relatively slight force applied to the leading end of the wire through the feed mechanism of the stitching head will cause the coil around the capstan to tighten sufficiently to enable the latter to draw more wire from the related spool.

In the form of the invention to be described herein, and which is illustrated in the accompanying drawings, there are three spools carrying wire to be delivered to three separate stitching heads. A single capstan member is provided in the path of movement of the wire between the spools and the stitching heads, and this capstan has three separate regions axially displaced from each other, in each of which one or two turns of wire from a related one of the three spools may be provided. The three wires are thus retained in sufficiently spaced relation to avoid having one wire become entangled with another.

The provision of the capstan, in accordance with the present invention, insures the delivery of wire to the stitching heads at a uniform rate, and only when it is needed. It eliminates the application of a sudden force to the wire coming from the spool in a manner to cause excessive rotation of the spool. Thus it insures proper supply of the wire under all operating conditions.

With the foregoing objects, features and advantages in mind, a preferred embodiment of the invention will now be described in detail in relation to the accompanying drawings, in which:

FIG. 1 is a largely schematic plan view of a wire stitching apparatus adapted to provide three separate stitches or staples in each booklet or the like that is advanced through the apparatus;

FIG. 2 is an elevational view, taken from the lower end of FIG. 1, showing schematically the arrangement of the stitching heads, the wire supplying spools, the capstan feeding mechanism for the wire, and related parts;

FIG. 3 is a plan view of one of the stitching heads having its top closure means swung into an open position to show the interior construction of the head;

FIGS. 4, 5 and 6 are detail views showing in plan certain parts within the stitching head which serve to cut a section of wire, from that being fed through the head, to form a staple, and means for turning the cut piece of wire through an angle of 90° for cooperation with bending and applying means;

FIG. 7 is a detail view showing in plan the mechanism for feeding the wire within the stitching head and for preventing its backward movement upon the return stroke of the feeder;

FIG. 8 is a schematic view in elevation showing the manner in which the wire feeding mechanism in the stitching head is thrown out of operation at a selected point in its movement in the direction of feed of the wire;

Figure 9:
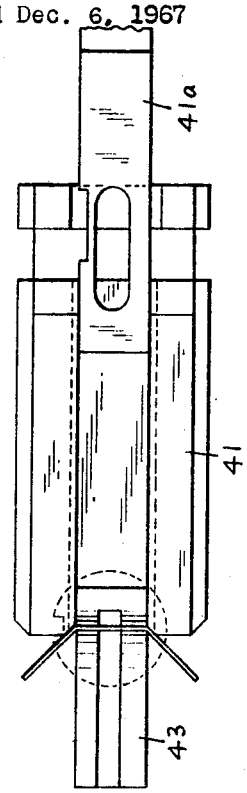
FIGS. 9, 10 and 11 are schematic views illustrating the operation of a bender bar in the stitching head which serves to bend the cut section of wire into the form of a staple.
Figure 10:
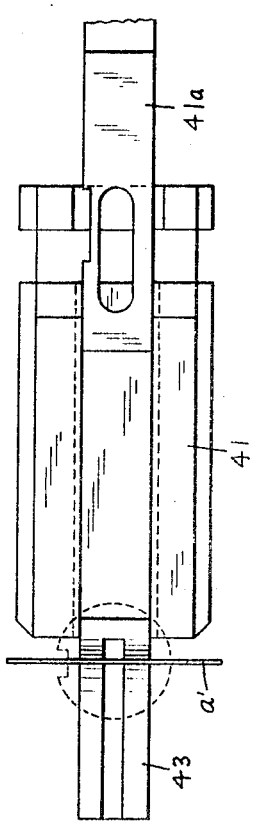
Figure 11:
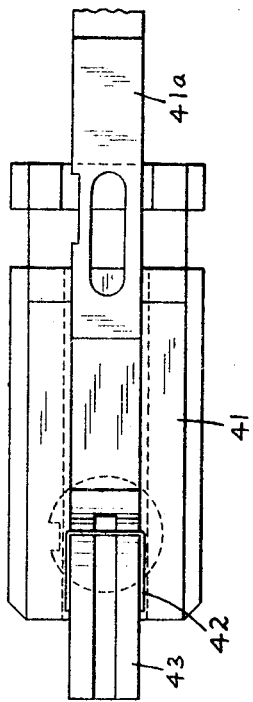

In the use of apparatus of the character here involved, without the provision of the special wire feeding means of the present invention, it has been found necessary to periodically vary the frictional resistance to turning of the wire supplying spools as the quantity of wire on the spools decreases. This is unnecessary when the apparatus is provided with the feeding means of the present invention. The spools may be subjected to the same frictional resistance to rotation throughout the operation of the machine, regardless of the weight of the spools. The frictional resistance against the free turning of the spools need be only sufficient to guard against a tendency of the spools to rotate too freely as the wire is being withdrawn from them. In accordance with this invention, the force applied to the wire, to withdraw it from its spool, is not suddenly applied, but rather is applied in a smooth, uniform manner.

The invention, as herein disclosed, has been applied to a stitching apparatus known as The Dexter No. 7 Book Stitcher, the conventional operation of which is well understood in the art. Accordingly, the nature of the stitcher heads employed and their mode of operation will be only schematically illustrated and briefly described to make clear the relationship thereto of the special wire supplying mechanism of this invention and the advantages derived from its use.

Turning now to the drawings, FIG. 1 shows three stitching heads 10, 11 and 12 which, as will be later explained, are mounted on a laterally movable carriage to enable said heads to apply staples to successive booklets 13 as the latter are advanced, one after another, along a supporting and guiding trough 14, by means to be described. The stitching heads contain mechanism for advancing wire therethrough in a direction along the longitudinal axes of said heads and for performing other operations upon the wire. It is because of the nature of the operations performed upon the wire within the heads, and by devices cooperating therewith, that the controlled delivery of wire to said heads is extremely important. The present invention provides a simple and highly effective means for insuring proper control over the delivery of the wire, so that no undue or sudden tension is applied to the wire and it is not pulled from the spools in a manner to cause unwanted rotation of the spools, which would lead to the presence of an excessive amount of loose wire between the spools and the stitching heads.

For supplying wire to the stitching heads 10, 11 and 12 there is provided a special attachment adapted to be secured to the frame of the apparatus. This comprises a supporting plate 15 adapted to be secured to the frame structure of the apparatus by a downwardly and rearwardly extending bracket means 15a. Secured to the plate 15 and extending upwardly therefrom are a plurality of pins 16. Three of such pins are shown in FIG. 1, each being adapted to receive a spool 17 carrying a supply of wire. It has been found possible to use the special wire supplying means of the present invention with the spools mounted for free rotation on the pins 16, with their weight being relied upon to create a desirable amount of friction in cooperation with the surface of plate 15 to prevent undue rotation upon the pulling of wire from the spools. The weight of the spools will normally create sufficient friction between their under surfaces and the top of plate 15 to achieve the result stated. However, if desired, an additional downward pressure may be applied to the spools by means of springs 18 surrounding the pins 16. A collar 19, having screw-threaded engagement with the pins 16, may be turned and adjusted to create any desired amount of force in the spring 18 serving to urge the related spool downwardly against the plate 15.

The respective wires supplied from the three spools shown in FIG. 1 are designated a, b and c. The wires a and b are passed over the outer surface of a resilient guide element 20 which may, if desired, be suitably provided with separate grooves or passages in its outer face for the two wires. The wire c passes from its spool over the surface of a resilient guide member 21. All three of the wires pass from the guide elements 20 and 21 to grooves provided in the outer surface of a capstan roller 22 mounted for rotation about a stud 23 mounted on the plate 15. A collar or sleeve 23a has the capstan secured thereto and is adapted for turning movement about the stud 23. Beneath the capstan roller 22 the sleeve 23a has secured thereto a pulley 24. This is connected by a belt 25 with a pulley 26 secured to a shaft 27. The latter is driven through suitable reduction gearing by a motor 28 carried by a bracket 29 secured to the plate 15. This arrangement is such that whenever the apparatus is put into operation, a motor 28 will be energized and will cause rotation of the sleeve 23a and the connected capstan roller at a desired speed. This should be a speed adapted to cause the capstan roller 22, when rendered active, to pull wire from the respective spools at the rate required to meet the demands of the stitching heads.

From the capstan roller 22 the wires, which have been given one or two turns around said roller, are passed to and over the outer surface of a resilient guide member 30. This preferably has a plurality of eye elements 30a, each of which is adapted to receive one of the wires, a, b and c, from which these wires are delivered to the stitching heads. As schematically indicated in FIG. 1, the wires so delivered are passed over the face of a resilient guide member 31, which is carried by each stitching head and is provided with wire retaining or guiding elements 31a adapted to direct the wire to the mechanism within the related stitching head.

Figure 15:
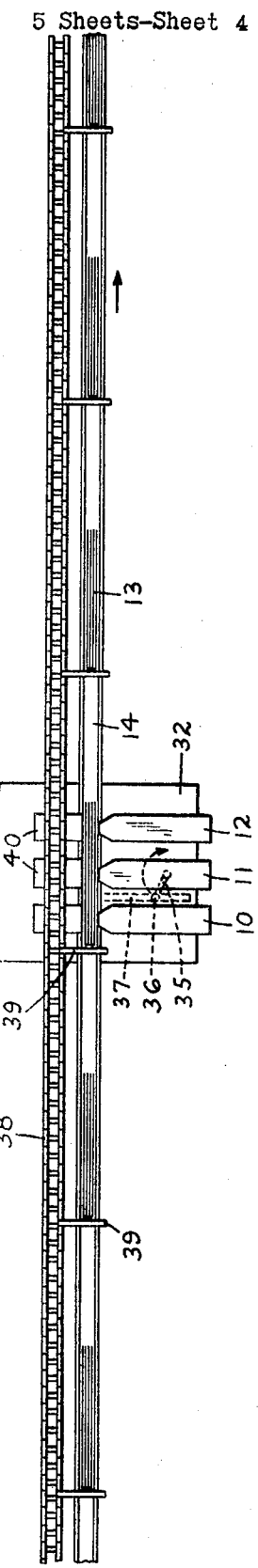
FIG. 15 is a schematic view showing the means for advancing booklets to be stitched successively along a supporting trough, and the relationship of the stitching heads to a booklet as the latter is passing through the stitching zone.

The stitcher heads 10, 11 and 12, and certain other devices to be described, are mounted on a carriage 32, FIGS. 1 and 15, which is adapted for reciprocation along a supporting bar or shaft 33. Thus, the stitching heads are moved back and forth in a direction parallel to the path of movement of the booklets 13. For this purpose, a shaft 34 driven by suitable connections from an electric motor or other power source, has secured thereto a crank arm 35 carrying at its outer end a crank element 36 which is preferably provided with a rotary sleeve or roller which cooperates with a groove or channel 37 in the carriage 32. This groove is disposed in a direction perpendicular to the supporting bar or shaft 33, so that as the crank arm 35 is rotated the carriage 32 will be shifted back and forth along the rod or shaft 33. The length of the crank arm 35 is such that the stitching heads will be shifted back and forth in a direction parallel with the line of feed of the booklets through a substantial distance, say about 8 to 10 inches.

Refering now to FIG. 15, there is shown schematically the means provided in the apparatus for advancing the successive booklets into and through the zone in which the stitching heads are active in applying staples to one of the booklets so advanced. For this purpose, an endless chain 38 is provided at a suitable level above the supporting surface of the trough 14 along which the booklets are advanced. This may suitably be at an elevation of about 4 inches above the supporting surface of the trough. At spaced intervals, the chain 38 carries horizontally disposed pins 39 adapted to extend across the path of movement of the booklets. In a typical construction these pins are spaced at intervals of 21 inches along the chain, and the chain is advanced at such a rate that each pin will move through a distance of 21 inches during each cycle of operation of the machine. It should be noted in this connection that the pins 39 are moved at a constant speed, while the carriage 32 with its stitching heads will be moved at a variable speed in each direction through the action of the crank mechanism described. This arrangement is such that during the application of staples by the stitching heads to a particular booklet, the later will be clamped, by mechanism to be described, by parts associated with the stitching heads and movable therewith. During this period the booklet and the stitching heads will be advanced toward the right (FIG. 15) at a speed at least as great as, and preferably slightly greater than, the speed of movement of the pins 39. When the application of staples to a particular booklet is completed, the clamping action is discontinued so that the trailing pin 39 will then reengage the trailing edge of the booklet and will continue to advance it at the rate of movement of said pin toward the right.

Figure 12:
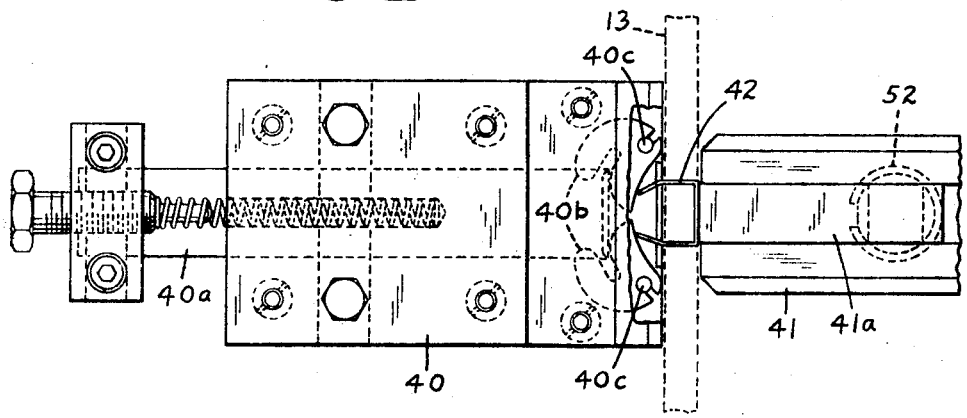
FIGS. 12 and 13 are schematic views showing, in plan, the cooperation of a clincher with the staple that has been driven through a booklet to inwardly bend the ends of the staple to complete the stitching operation.
Figure 13:
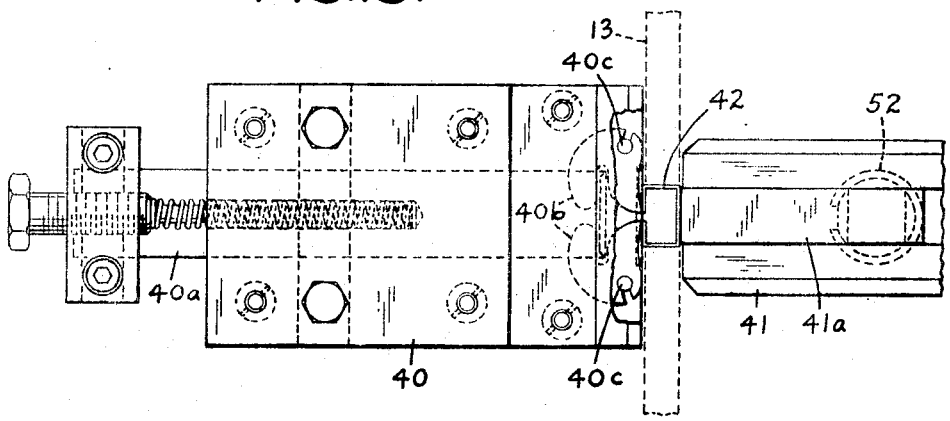
Figure 14:
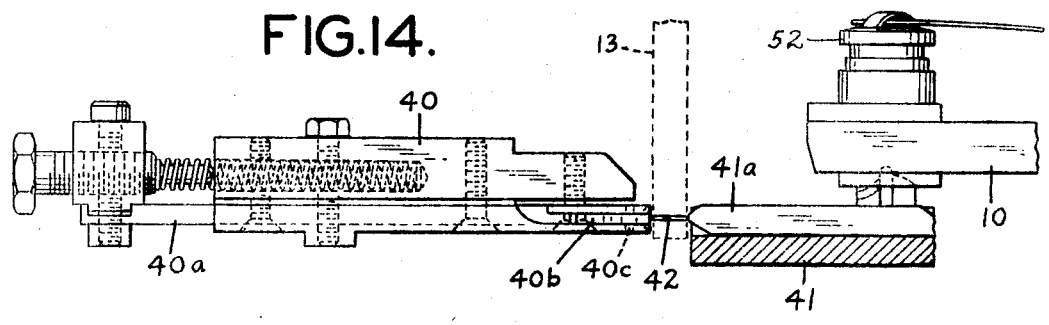
FIG. 14 is an elevational view showing schematically the cooperation of the clincher with the booklet and the bender bar.

The means above-mentioned for clamping the booklet includes clincher members 40, on the opposite side of the booklet from the stitching heads, and cooperating bender bars 41 carried by the stitching heads. It will be understood that if three staples are to be applied to each booklet there will be three clincher members 40 and three cooperating bender bars 41 acting simultaneously upon a booklet. As will be understood from the known construction of The Dexter No. 7 Book Stitcher, to which the present invention has been shown to be applied, in each cycle of operation of the apparatus certain cams carried by the frame structure will serve to shift the clinchers 40 and the bender bars 41 toward the booklets to clamp the same as the stitching heads are being shifted in the direction of movement of the booklet. Such clamping will take place at about the time that the stitching heads have attained the same speed of lateral movement as that imparted to the booklet by the pins 39. Within each of the clincher members 40 there is a longitudinally movable member 40a which cooperates with elements 40b that are rockable about pivots 40c. Thus, after the main body of the clincher member 40 has been brought into clamping engagement with the booklet, the bar 40a will be moved a suitable distance toward the booklet to cause the members 40b to rock from the position shown in FIG. 12 to that shown in FIG. 13. This brings about completion of the folding of the staple 42 that has been previously driven through the booklet by a driver carried by the bender bar 41, as will be later explained. This driver is indicated at 41a in FIGS. 9–13.

Prior to the cooperation of the clinchers and bender bars, as explained above, there are certain devices within the stitching heads to bring about the cutting of the wires received from the spools into staple length sections and then the bending of such sections of wire into the form of a staple. This means includes a supporter element 43 which is rockably carried by the stitching head adjacent its stitch applying end. (See FIG. 3.) The arrangement is such that the driver bar 41a within the stitching head serves to shift the bender bar 41 toward the section of wire and then beyond the longitudinal axis of said section of wire to bend the free ends of said section around shoulders provided on the lower end of a swivel member 52 in the region of the support member 43, in the manner shown in FIGS. 9–11. After this bending of the wire into staple form has been completed, the swivel will be lifted slightly away from the staple, and the bender bar is advanced further toward the left until it is brought into engagement with the booklet. At this time the driver bar 41a which has been moving along with the bender, will be shifted relative to the bender, by suitable cam means provided on The Dexter Book Stitcher mentioned above, to force the staple through the booklet. The staple thus forced through the booklet is designated 42 in FIGS. 11–14. As the staple is being forced from the bender into the booklet, the support member 43 will be rocked downwardly out of the path of the staple and the driver bar 41a.

Referring now to FIG. 3, there is shown in plan the main body of the stitching head 10 with its two top closure members 10a and 10b swung open to show the interior construction. The wire a is delivered into this stitching head from the capstan roller 22 along the resilient guide 31. As the wire passes forwardly, it is first directed along a path determined by vertical straightening rollers 44 and it then passes along a path determined by horizontal straightening rollers 45. From the latter the wire extends into a passage provided within a stationary member 46. (See also FIG. 7.) The latter has a flat roller or disc 46a within a tapered passageway 46b, this roller or disc being urged by a spring 46c toward the narrower end of the passage. It thus serves to grip the wire and prevent its backward movement when the machine is at rest and also when the feed mechanism, to be described, is returned to its starting position. In fact, it tends to pull some wire from the spool as the stitching head is moved laterally by the crank element 36, since during a portion of such movement the distance between the wire guiding members 30 and 31 will increase, thus exerting a pull on the wire. The measured amount of feeding action is imparted to the wire by a member 47 (FIG. 7) which is shifted away from the fixed member 46 by suitable cam means, at an appropriate time in the cycle of operation of the machine, and it is then idly restored to its initial position. When it is shifted away from member 46 the wire is squeezed by a disc or roller 47a against the left wall of the divergent passage 47b. Disc 47a is urged by a spring 47c toward the narrower portion of the passage 47b to assist in gripping the wire and thus enabling the member 47 to feed it forwardly. This feeding action continues until a rockable member 47f serves to shift the disc 47a toward the forward, wider region of the passage. Element 47f is pivotally mounted on an upwardly extending flange 47d of the member 47 (FIG. 8) the pivot being provided by a pin 47e. Normally the element 47f will be urged into the position shown in full lines in FIG. 8 so that it permits the disc 47a to provide the wire gripping action explained. However, when the desired length of wire has been advanced by the feed mechanism, an upwardly extending bump 47g on element 47f will engage a cam 48 which rocks element 47f in a clockwise direction into the dotted-line position shown at the left of FIG. 8. This results in the pushing of the disc 47a toward the left, or in the upward direction as the parts are shown in FIG. 7. As a result the disc 47a no longer exerts its pulling force upon the wire. The cam 48 may be adjusted to stop the feeding action when the desired length of wire to form a single staple has been advanced. Even though the member 47 may continue to move somewhat further, the element 47f will have stopped the feeding action by virtue of the shifting of the disc 47a.

The wire is threaded within the stitching head for a considerable distance beyond the feeding mechanism and when it reaches a point adjacent the upper end of the head (FIG. 3), it is cut into the desired staple length and the section so cut is turned into the position shown in FIG. 9. The means for cutting and thus turning the severed section of the wire is illustrated in FIGS. 4–6. Thus, the wire is advanced from right to left in FIG. 4 through the path of a cutter having a stationary blade 49a and a movable blade 49b. The movable blade is operated by a cam acting upon the support for this blade at the desired time in the movement of the stitching head in a lateral direction in the manner previously described. After section a' of the wire has been severed by the blades 49a and 49b, the latter blade is retracted and a segment 50 is rocked into the position shown in FIG. 6. This is accomplished by the action of a spring 50b, FIG. 3, upon disengagement of an element 51 from an arm 50a connected with the segment 50. Element 51 is carried by the driver 41a, as shown in FIG. 3, so it is given a substantial movement during each cycle of the machine. The spring 50b, FIG. 3, normally urges the arm 50a in the direction shown in FIG. 6 when the element 51 is out of the path of the arm. The rocking of segment 50 in a counterclockwise direction into the position shown in FIG. 6 causes the swivel element 52 to rotate through an angle of 90°. This is due to the action of the toothed segment 50 on corresponding teeth in the periphery of the swivel member. As will be seen from FIG. 6, this results in the turning of the section a' of the wire at right angles to its previous direction of movement and makes it ready for the bending operations shown in FIGS. 9–11.

It is believed that from the foregoing description of the invention it will be appreciated that certain problems heretofore encountered in the use of existing book stitching heads and related devices have been overcome. The capstan 22, shown in FIGS. 1 and 2, serves to insure the smooth withdrawal of wire from the several spools and the delivery of such wire to the stitching heads as these require the wire to be delivered to the feed mechanism, cutting mechanism and staple turning mechanism embodied in each of the stitching heads. There is no tendency to pull the wire from a spool in such a manner as to cause spinning of the spool and the delivery of excess wire. The resting of the spools directly on the plate 15 will normally insure this, but if desired, a certain amount of spring pressure may also be applied to the spools by the springs 18 through adjustment of the screw elements 19. Such adjustment need be made only once throughout the use of the wire on a particular spool.

While a preferred embodiment of the invention has been disclosed in some detail, it is believed clear that changes may be made in the various features of the overall construction within the scope of the invention.

What is claimed is:
1. Apparatus for applying wire stitches to booklets or the like which comprises: a plurality of stitching heads, means for producing relative movement between said stitching heads and a succession of booklets to be stitched, a plurality of wire retaining spools, means for guiding wire from each of said spools to a related stitching head, means in each of said heads for feeding the wire delivered to it from one of said spools and for cutting said wire into desired sections and for then applying the cut sections to successive booklets, a capstan roller in the path of the wires being delivered from said spools to the stitching heads, each wire being wrapped at least one turn about said roller, and means for driving said roller at a predetermined speed, said capstan roller having a plurality of groovular passages around its outer surface, each passage being adapted to receive and retain at least one turn of wire about the roller delivered to it from one of said spools and adapted to retain such wire in spaced relation from another wire wrapped around the roller delivered to it from another spool.

References Cited

UNITED STATES PATENTS

| | | | |
|---|---|---|---|
| 970,461 | 9/1910 | Briggs | 227—88 |
| 1,608,838 | 11/1926 | Christensen | 227—81 |
| 1,762,235 | 6/1930 | Metcalf et al. | 227—88 |
| 2,697,829 | 12/1954 | Winkler | 227—88 |
| 3,098,596 | 7/1963 | Kulicke et al. | 226—117 |

GRANVILLE Y. CUSTER, JR., Primary Examiner

U.S. Cl. X.R.
227—85, 92; 226—117